US010649154B1

(12) United States Patent
Zhou et al.

(10) Patent No.: US 10,649,154 B1
(45) Date of Patent: May 12, 2020

(54) FIELD OF VIEW CONVERTER FOR FIBER-OPTIC CONNECTOR ENDFACE INSPECTOR

(71) Applicant: LIGHTEL TECHNOLOGIES, INC., Renton, WA (US)

(72) Inventors: GE Zhou, Renton, WA (US); Shangyuan Huang, Seattle, WA (US)

(73) Assignee: LIGHTEL TECHNOLOGIES, INC., Renton, WA (US)

( * ) Notice: Subject to any disclaimer, the term of this patent is extended or adjusted under 35 U.S.C. 154(b) by 0 days.

(21) Appl. No.: 16/280,748

(22) Filed: Feb. 20, 2019

(51) Int. Cl.
    *G02B 6/38*    (2006.01)
    *G02B 6/40*    (2006.01)
    *G01M 11/00*    (2006.01)

(52) U.S. Cl.
    CPC .............. *G02B 6/385* (2013.01); *G01M 11/30* (2013.01); *G02B 6/403* (2013.01)

(58) Field of Classification Search
    CPC ......... G02B 6/385; G02B 6/403; G01M 11/30
    See application file for complete search history.

(56) References Cited

U.S. PATENT DOCUMENTS

2016/0341904 A1\* 11/2016 Morin-Drouin ....... G02B 6/385

\* cited by examiner

*Primary Examiner* — Ryan A Lepisto
(74) *Attorney, Agent, or Firm* — Pai Patent & Trademark Law Firm; Chao-Chang David Pai

(57) ABSTRACT

An adapter for converting the field of view (FOV) of a connector endface inspector includes a housing with a front end for connecting with a fitting tip for interfacing with a fiber-optic connector, a rear end for connecting to a front portion of the inspector, and an internal light passage. A relay lens system including a front lens group and a rear lens group is embedded inside the housing across the light passage. To achieve a converted FOV, the optical working distance of the relay lens system is made the same as the optical working distance of the connector inspector's microscope objective, and the front focal length is made larger or smaller than the rear focal length of the relay lens system. The rear lens group may be embedded in a portion of the housing that may be detached and replaced to vary the size of the converted FOV.

12 Claims, 9 Drawing Sheets

Expanded FOV

FOV

FIELD OF VIEW CONVERTER FOR FIBER-OPTIC CONNECTOR ENDFACE INSPECTOR

BACKGROUND OF THE INVENTION

1. Field of the Invention

The present invention generally relates to inspection of fiber-optic connector endfaces. More particularly, the present invention relates to an adapter for expanding or reducing the field of view of a fiber-optic connector endface inspector to enable the connector endface inspector to inspect fiber-optic connectors with endfaces larger or smaller than conventional ones.

2. Description of the Related Art

The fiber connector inspector, a kind of inspection devices with microscopes, (or simply connector inspector or inspector in the following discussion) has been an essential appliance in the field of fiber-optic communications. The inspector is used to inspect the endfaces of a fiber-optic connector to check if it is clean and undamaged in the communication system.

When a connector inspector is used to view or image the endface of a fiber-optic connector, a fitting tip for the connector inspector is needed to provide a mechanical interface with the connector ferrule or the connector adapter.

A fitting tip for a connector inspector has two functions:

(1) align the optical axis of the microscope objective of the connector inspector so that it is perpendicular to the connector endface, and pointed to the center of the fiber;

(2) ensure that the connector endface is positioned within the focusing adjustment range of the microscope objective of the connector inspector.

As an example, FIG. 1 shows a fitting tip 24 for the inspector 10 to inspect the endface 441 of a PC male connector 44. The fitting tip 24 has a front inner passage 244 for receiving the ferrule 440 of the PC male connector 44 and an annular stop surface 241 for stopping the endface 441 of the connector 44. For any fitting tip 24 to work with the inspector 10, the fitting tip 24 must be designed such that when it is connected between the connector 44 and the inspector 10, the optical working distance WD1 of the microscope objective 130 of the inspector 10 is equal to the distance between the endface 441 and the first optical surface 131 of the microscope objective 130.

Due to the advantages of optical fibers, the fiber-optic technology continues to broaden its application fields, such as Fiber Optic Surgery in the medicine, polymer optical fibers and fiber-optic bundles communication in the aviation industry, and large core fibers for high power delivery in the laser welding, etc. As one may expect, the endfaces of the fibers in these fields also need to be inspected. The inspector that is used for optical communication is not able to directly satisfy the requirements in these fields, because the fiber diameters used in these fields often are larger than those in the communication field, and therefore larger field of view (FOV) is required. We can design new inspectors specifically for these fields, but it will be easier and more cost efficient to modify the current inspectors or design adapters for the current inspectors to suit them to the new application fields. The reason is: in most of the applications, the connector ferrule used for larger core fiber connector is the same as the connector ferrule for optical communication, such as 1.6 mm and 2.5 mm diameter ferrule, so existing fitting tips for the current inspectors still can be used for inspecting larger core optical fibers.

The FOV of a connector inspector is defined as the area of the object that may be observed by the connector inspector. The FOV of the existing connector inspectors is generally too small to cover the entire endface of a big core fiber. As a result, no satisfactory endface image can be obtained for an effective connector inspection.

Therefore, there is an urgent need for a solution to convert the small FOV of existing connector inspectors to one that is able to view an optical connector of a fiber with larger core diameters.

BRIEF SUMMARY OF THE INVENTION

The objective of the present application is to provide an adapter or converter for expanding the field of view (FOV) for existing fiber-optic connector endface inspectors and matching fitting tips to effectively inspect fiber-optic connectors with endfaces larger than those of optical communication fibers. Another objective of the present application is to provide an adapter or converter for reducing the FOV for existing fiber-optic endface inspectors and matching fitting tips to inspect fiber-optic connectors with a more clearly visible image.

The FOV converter according to the present application includes a housing with a front end for connecting with a matching fitting tip for interfacing with a fiber-optic connector to be inspected, a rear end for connecting to a front portion of the connector inspector, and an internal light passage extending from the front end to the rear end. A relay lens system is disposed inside the housing across the light passage. For achieving an expanded FOV, the optical working distance of the relay lens system is set to be the same as the optical working distance of the connector inspector's microscope objective, and the object distance is set to be larger than the image distance of the relay lens system. On the other hand, for achieving a reduced FOV, the optical working distance of the relay lens system is set to be the same as the optical working distance of the connector inspector's microscope objective, and the object distance is set to be smaller than the image distance of the relay lens system. Moreover, when the front end of the housing of the FOV converter is connected to an existing matching fitting tip for the connector inspector and the rear end of the housing is connected to the connector inspector, the optical axis of the relay lens system is aligned with the optical axis of the microscope objective of the connector inspector; the image plane of the relay lens system will coincide with the object plane of the connector inspector's microscope objective; and the connector endface interfaced with the fitting tip will be imaged through the relay lens system on the image plane of the relay lens system.

With the FOV converter, the original FOV of the connector inspector is converted (i.e. expanded or reduced) and the ratio of the converted FOV to the original FOV is equal to the ratio of the object distance to the image distance of the relay lens system.

The housing of the FOV converter may be assembled from two portions detachable from each other: a connector-side portion and an inspector-side portion with the relay lens system embedded in the connector-side portion. This makes it easier to replace the connector-side portion of the FOV converter for achieving a different ratio of the converted FOV.

Further, the relay lens system includes two lens groups, the front lens group and rear lens group, the connector-side portion of the housing may be assembled from two portions detachable from each other: a connector-side front portion with the front lens group embedded therein and a connector-side rear portion with the rear lens group embedded therein. That way, the connector-side rear portion may be detached from the connector-side front portion and the inspector-side portion and then replaced by another one with a different rear lens group to achieve a different ratio of the converted FOV.

In an embodiment of the FOV converter, the matching fitting tip may be integrally formed with the connector-side portion or the connector-side front portion as a single component. Although it is convenient for the FOV converter to have an integrated fitting tip, such an FOV converter cannot be used with other existing types of fitting tips.

DETAILED DESCRIPTION OF THE INVENTION

The field of view (FOV) converter for a fiber-optic connector endface inspector according to the present application will be described in the following in conjunction with the accompanying drawings briefly described above.

Figure 1:
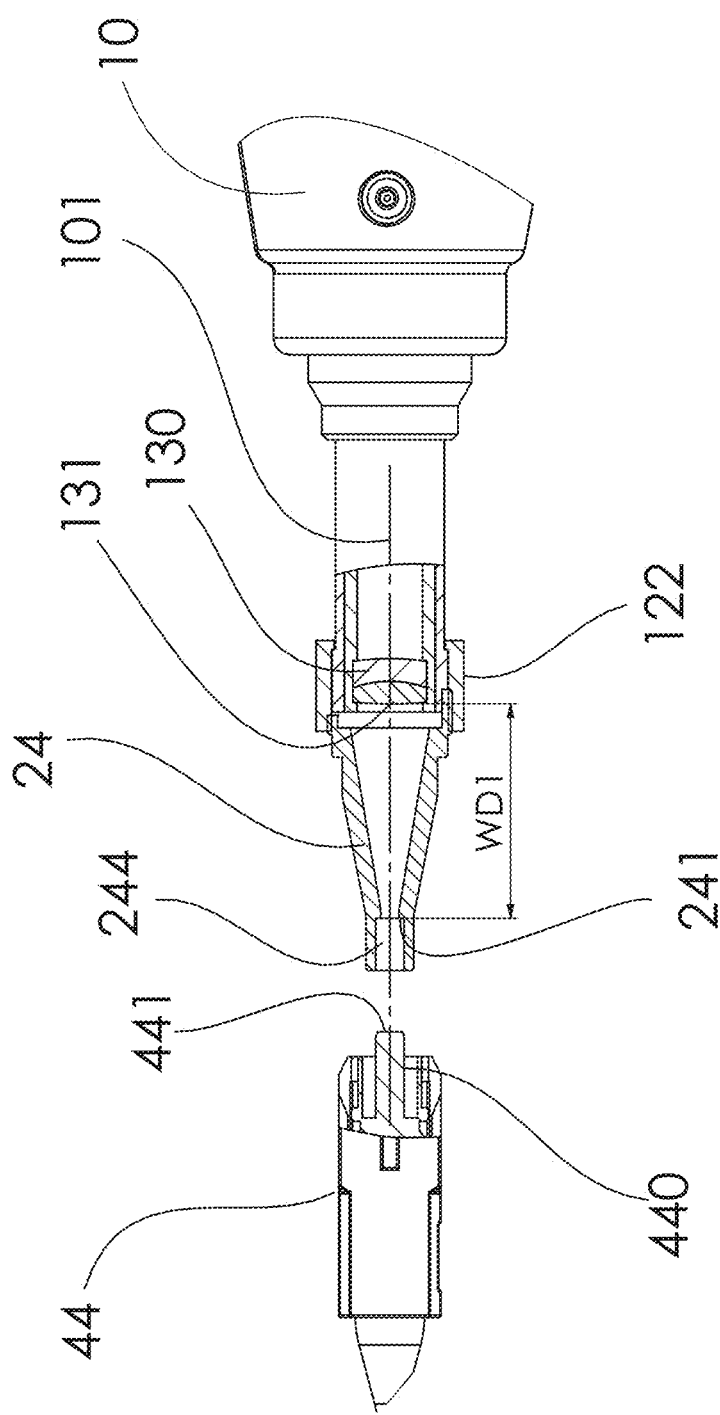
FIG. 1 shows a fiber-optic connector endface inspector with a fitting tip designed for inspecting a PC (physical contact) male connector.
Figure 2:
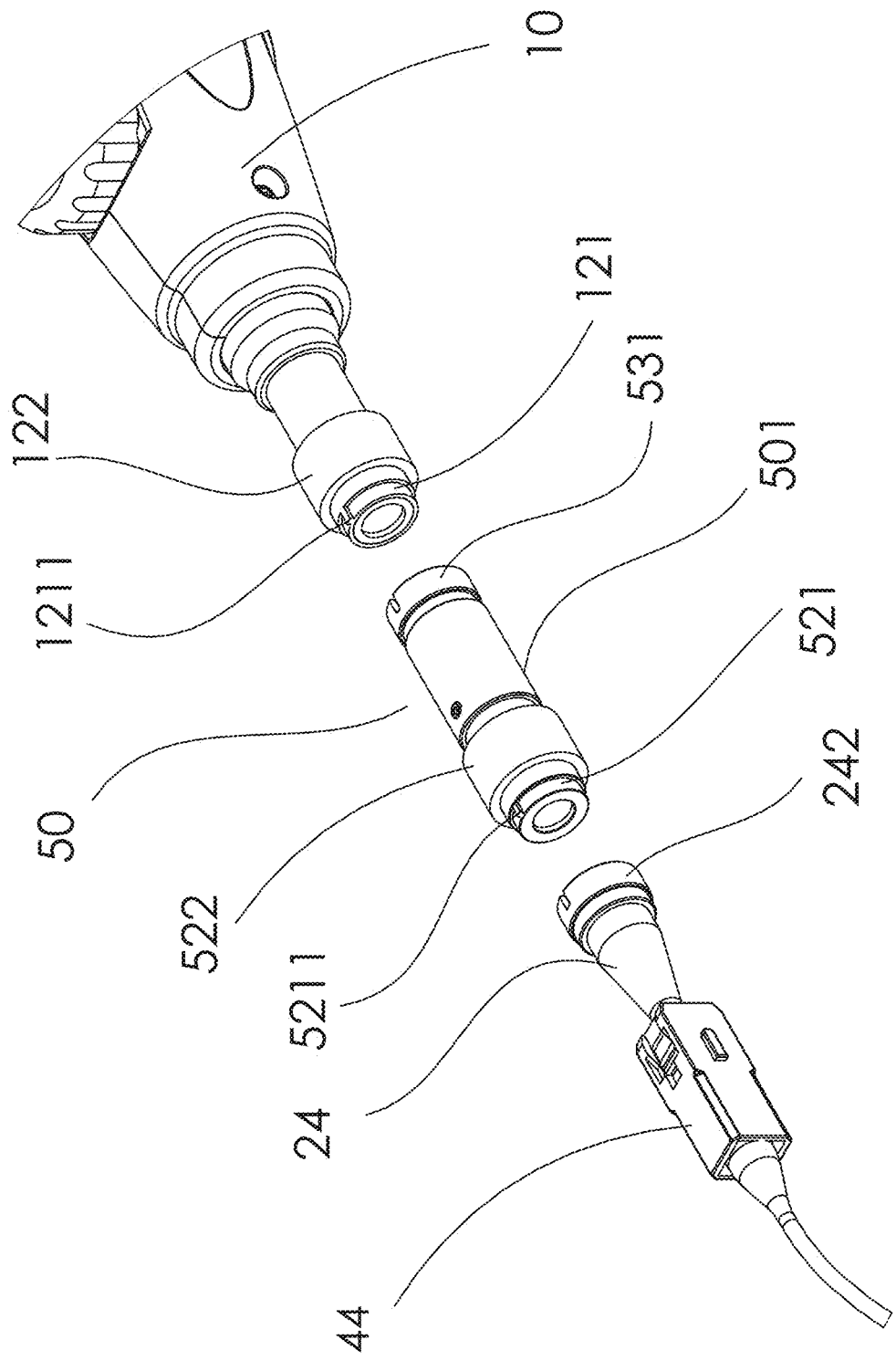
FIG. 2 shows the FOV converter according to the present application in relative position for connecting to a connector inspector, a matching fitting tip for the connector inspector to interface with a PC male connector to be inspected.

FIG. 2 shows the external structure of the FOV converter 50 according to the present invention in relative position for connecting to a connector inspector 10, a matching fitting tip 24 designed for the connector inspector 10 to interface with a PC male connector 44 to be inspected. For convenience, without losing generality, the direction pointing from the connector endface inspector 10 towards the connector 44 is designated as "front", and the opposite direction is designated as "rear".

As shown in FIG. 2, the housing 501 of the FOV converter 50 has a front end 521, a rear end 531 and an internal light passage extending from the front end 521 to the rear end 531. The front end 521 of the housing 501 is to be connected to the rear end of the matching fitting tip 24; the rear end 531 of the housing 501 is to be connected to the front portion 121 of the connector inspector 10, namely, where a matching fitting tip 24 would be installed if no FOV converter 50 were used. The structure of the front end 521 of the housing 501 is the same as the structure of the front portion 121 of the connector inspector 10; similarly, the structure of the rear end 531 of the housing 501 is the same as the structure of the rear end 242 of the matching fitting tip 24. This design makes sure that the FOV converter 50 is compatible with the various existing types of fitting tips designed for the connector inspector 10. More specifically, the FOV converter 50 is fixed to the connector inspector 10 by screwing the nut 122 of the connector inspector 10 over the male thread on the rear end 531 of the housing 501. The matching fitting tip 24 is fixed at the front end 521 of the housing 501 using a nut 522 at the front end 521 of the housing 501 over the male thread at the rear end 242 of the fitting tip 24. The front end 521 of the housing 501 has an outer diameter identical to the outer diameter of the front portion 121 of the endface inspector 10 and has a key 5211 identical to the key 1211 on the front portion 121 of the connector inspector 10. Therefore, the FOV converter 50 is compatible with the fitting tip 24 when connected between the fitting tip 24 and the connector inspector 10.

Figure 3:
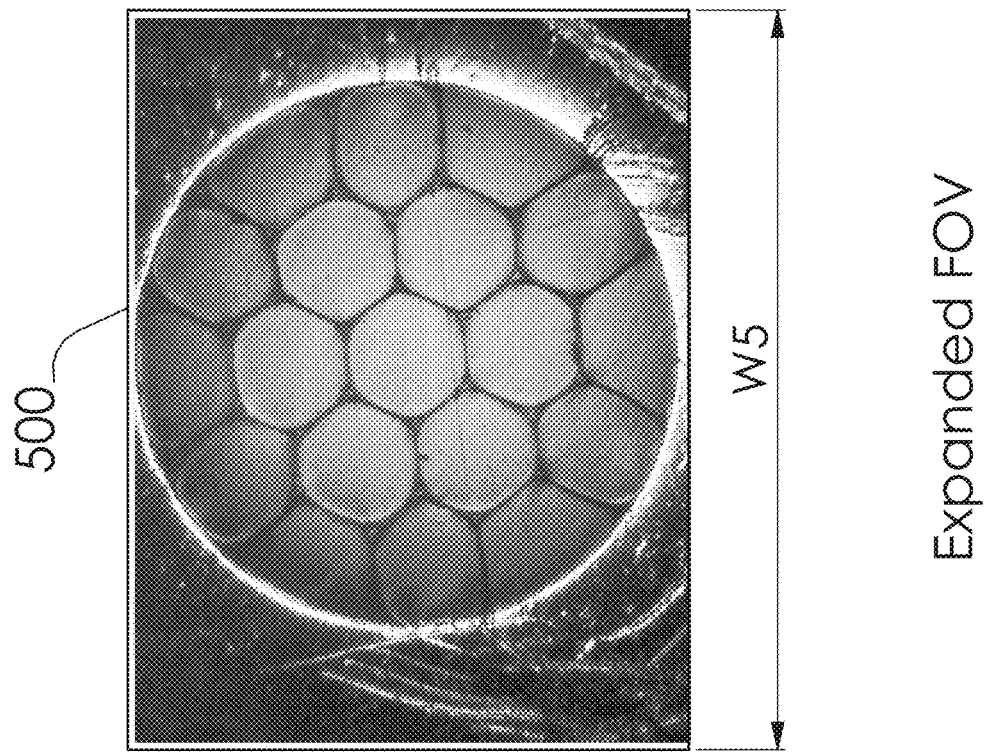
FIG. 3 shows the original FOV of the connector inspector as compared to the converted FOV achieved by the FOV converter according to the present application.
Figure 3:
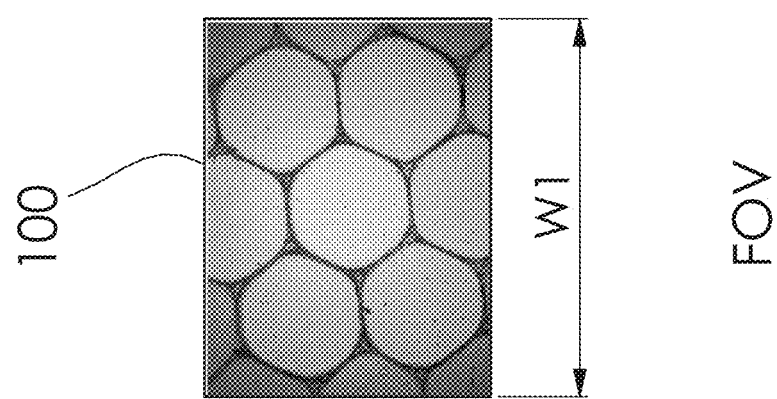

FIG. 3 shows the original or native FOV 100 of the connector inspector 10 as compared to the converted (expanded herein) FOV 500 achieved by the FOV converter 50 according to the present application. In FIG. 3, the FOV 100 with a width W1 is the original or native FOV of the connector inspector 10, and the expanded FOV 500 with a width W5>W1 is the expanded FOV achieved by the FOV converter 50. The connector shown in FIG. 3 contains a plurality of fiber-optic bundles within a ferrule of 2.5 mm diameter. As illustrated, the original FOV 100 is able to cover only a middle portion of the connector endface, whereas the expanded FOV 500 is able to cover the entire connector endface.

Figure 4:
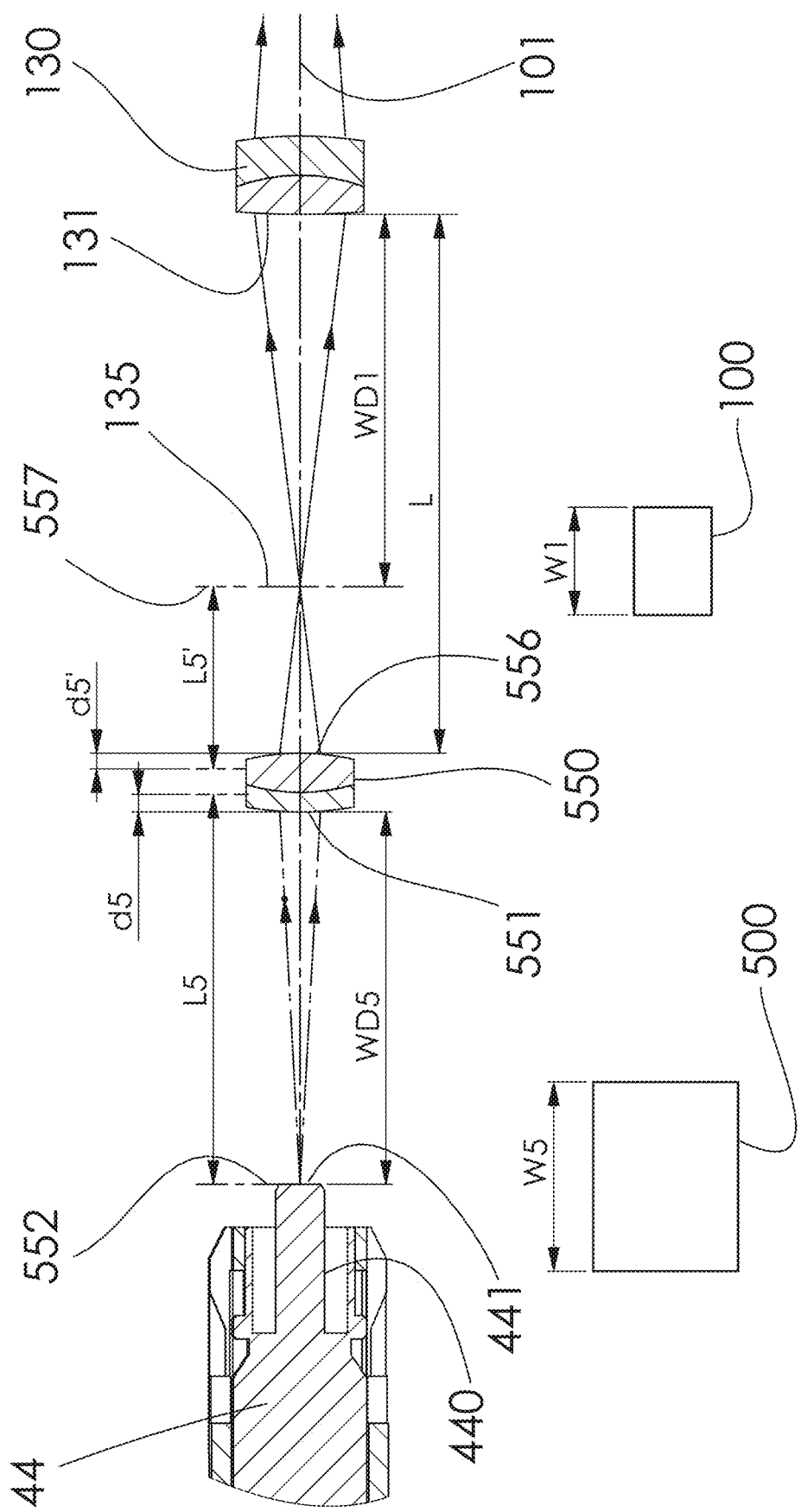
FIG. 4 shows the relay lens system of the FOV converter according to an embodiment of the present application in relative position to a connector inspector and a fitting tip to illustrate the optical principle of the FOV converter.

FIG. 4 illustrates the optical principle of the FOV converter 50 according to an embodiment of the present invention. A relay lens system 550 is disposed inside the housing 501 across the light passage in the housing 501 for converting (expanding herein) the FOV of the connector inspector 10. In FIG. 4, a physical contact (PC) male fiber-optic connector 44 is used to illustrate the FOV converter 50, however, the optical principle may be applied to other fiber-optic connectors without losing generality. When the FOV converter 50 is connected between the connector 44 (through the fitting tip 24 installed at the front end 521 thereof as described above) and the connector inspector 10, the optical axis of the relay lens system 550 is aligned with the optical axis 101 of the microscope objective of the connector inspector 10. Moreover, the relay lens system 550 and the FOV converter 50 are designed and dimensioned such that the endface 441 of the ferrule 440 of the connector 44 is positioned on the object plane 552 of the relay lens system 550, and the image plane 557 of the relay lens system 550 coincides with the object plane 135 of the microscope objective 130 of the connector inspector 10. As illustrated, L5 represents the object distance of the relay lens system 550, and L5' represents the image distance of the relay lens system 550. Therefore, the FOV 100 of the connector inspector 10 lies on the object plane 135 of the microscope objective 130, or equivalently on the image plane 557 of the relay lens system 550. In contrast, the expanded FOV 500 of the relay lens system 550 lies on the object plane 552 of the relay lens system 550, or equivalently on the endface 441 of the connector 44.

According to the principle of optics, the ratio of the size of the converted FOV 500 to the size of the FOV 100 is $$M=W5/W1=L5/L5' \quad (1)$$

where W5 and W1 are the width of the converted FOV 500 and the width of the original FOV 100, respectively. If the object distance L5 is greater than the image distance L5', as exemplified in FIG. 3 and FIG. 4, then M>1 and the converted FOV 500 will cover a larger area than the original FOV 100. On the other hand, if M<1, then the converted FOV 500 will cover a smaller area than the original FOV 100, namely, the original FOV 100 is reduced. With a reduced FOV 500, a more clearly visible image will be obtained in the area covered by the reduced FOV 500.

In practical design, in order for the FOV converter 50 for the connector inspector 10 to work with various existing types of fitting tips designed for the connector inspector 10, the optical working distance WD5 of the relay lens system 550 is set to be the same as the optical working distance WD1 of the microscope objective 130 of the connector inspector 10. Since the value of WD5=WD1 is known, the object distance L5 may be determined as $$L5=WD5+d5 \quad (2)$$

where d5 is the distance from the vertex of the front optical surface 551 to the front principal plane of the relay lens system 550. Then, for a given M value, the value of the image distance L5' may be calculated from formula (1), i.e. L5'=L5/M, and the value of L (the distance from the vertex of the rear optical surface 556 to the front optical surface 131 of the microscope objective 130 of the connector inspector 10) may be determined according to $$L=L5'-d5'+WD1 \quad (3)$$

where d5' is the distance from the vertex of the rear optical surface 556 to the rear principal plane of the relay lens system 550. Finally, the relay lens system 550 for a given M value and a particular connector inspector 10 may be designed and constructed accordingly.

Figure 5:
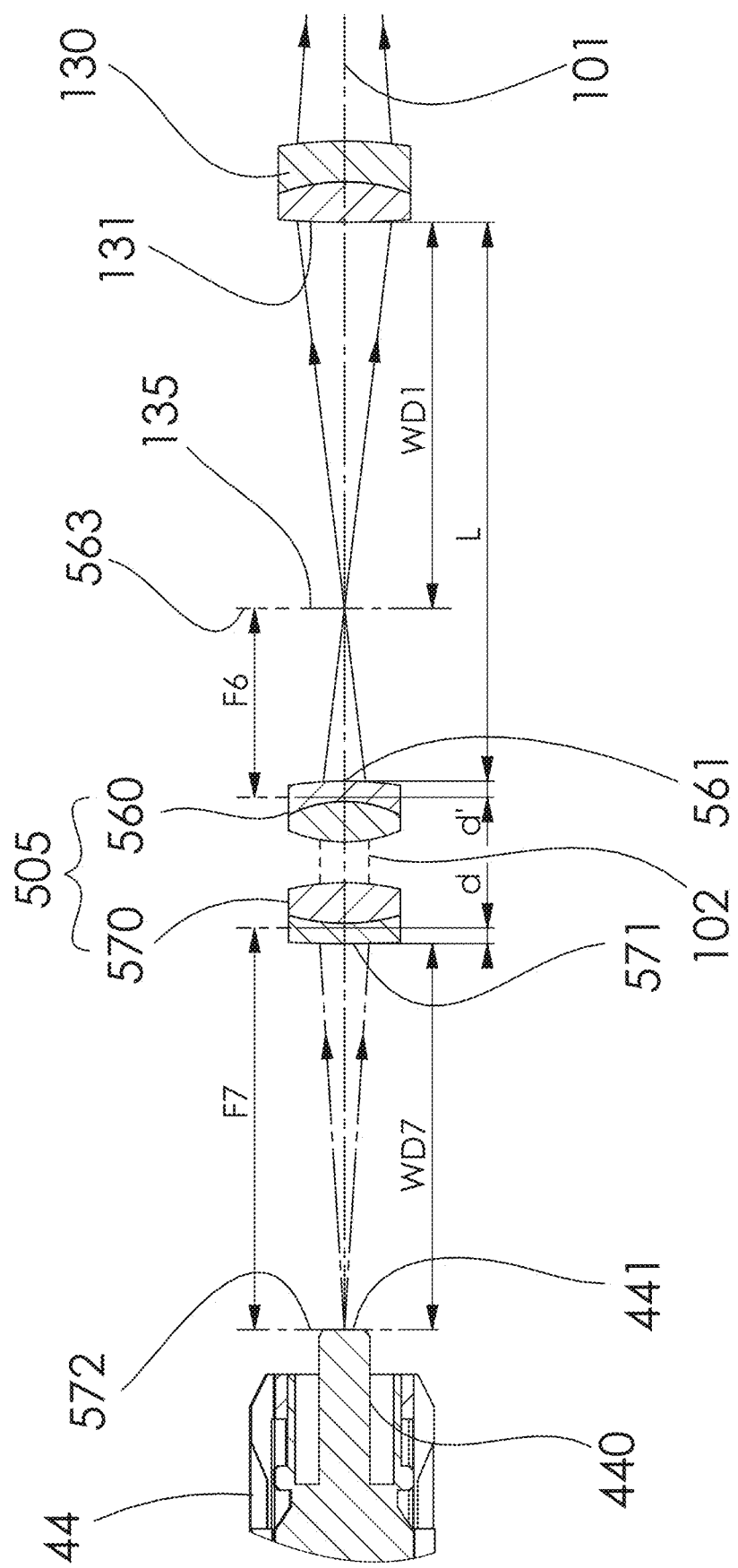
FIG. 5 shows the relay lens system with two lens groups of the FOV converter according to another embodiment of the present application in relative position to a connector inspector and a fitting tip to illustrate the optical principle of the FOV converter.
Figure 6:
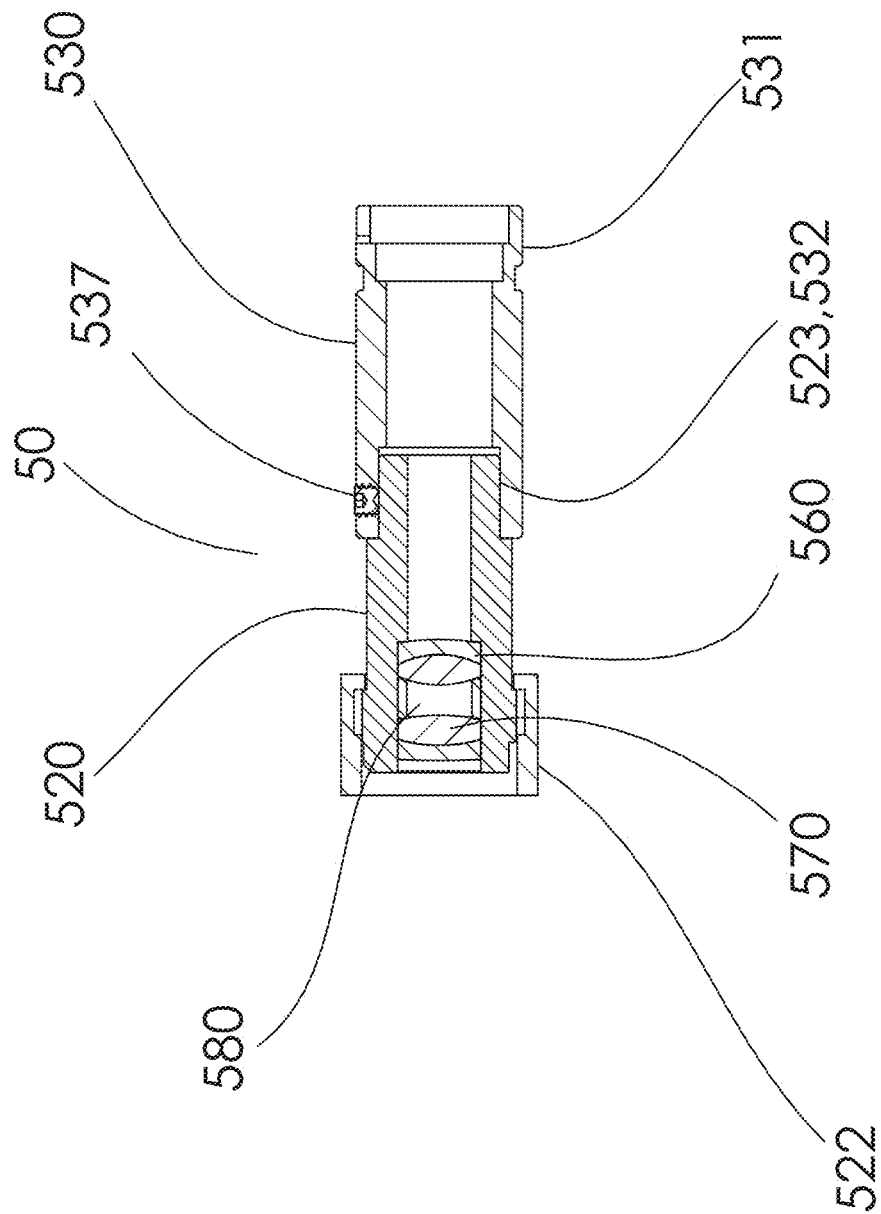
FIG. 6 shows the internal structure of an FOV converter composed of two detachably coupled portions and using the relay lens system shown in FIG. 5.

FIG. 5 illustrates the optical principle of the FOV converter 50 according to the present application using another embodiment of the relay lens system. The relay lens system 505 of the FOV converter of this embodiment includes a front lens group 570 and a rear lens group 560 separated at a distance, preferably by a spacer 580 (as illustrated in FIG. 6). The relay lens system 505 is designed such that the endface 441 of the ferrule 440 of the fiber-optic connector 44 is positioned on the front focal plane 572 of the front lens group 570, the image plane of the relay lens system lies on the rear focal plane 563 of the rear lens group 560, light rays 102 between the front lens group 570 and the rear lens group 560 are parallel, and the rear focal plane 563 of the rear lens group 560 coincides with the object plane 135 of the microscope objective 130 of the connector inspector 10. In other words, the front focal plane 572 of the front lens group 570 corresponds to the object plane, and the rear focal plane 563 of the rear lens group 560 is the image plane, respectively, of the relay lens system 505. Therefore, the object distance of the relay lens system 505 is equal to the front focal length F7 of the front lens group 570, and the image distance of the relay lens system 505 is equal to the rear focal length F6 of the rear lens group 560 in the optical system shown as FIG. 5.

In FIG. 5, WD7 denotes the optical working distance of the relay lens system 505 (i.e. the distance from the front focal plane 572 to the front optical surface 571 of the front lens group 570). With the FOV converter 50 in FIG. 5, the ratio of the size of the expanded FOV 500 to the size of the FOV 100 is $$M=F7/F6 \quad (4)$$

Therefore, F7 will be set to be larger than F6 for the expanded FOV 500 to cover a larger area of the endface 441 than does the FOV 100. In practical design, in order for the FOV converter 50 for the connector inspector 10 to work with various existing types of fitting tips designed for the connector inspector 10, WD7 is set to be the same as the optical working distance WD1 of the microscope objective 130 of the inspector 10. Since the value of WD7=WD1 is known, the front focal length F7 may be determined as $$F7=WD7+d \quad (5)$$

where d is the distance from the vertex of the front optical surface 571 to the front principal plane of the front lens group 570. Then, for a given M value, the value of the rear focal length F6 of the rear lens group 560 may be calculated from formula (4), namely F6=F7/M, and the value of L (the distance from the vertex of the rear optical surface 561 of the rear lens group 560 to the front optical surface 131 of the microscope objective 130 of the inspector 10) may be determined according to $$L=F6-d'+WD1 \quad (6)$$

where d' is the distance from the vertex of the rear optical surface 561 to the rear principal plane of the rear lens group 560. Therefore, the relay lens system 505 for a given M value and a particular connector inspector 10 may be designed and constructed accordingly.

The advantages of the embodiment of the FOV converter 50 shown in FIG. 5 is that the M value and therefore the size of the expanded FOV 500 may be changed by keeping the front focal length F7 of the front lens group 570 and varying the rear focal length F6 of the rear lens group 560 of the relay lens system 505.

FIG. 6 shows the internal structure of the FOV converter 50 implementing the design principle and the embodiment of the relay lens system 505 shown in FIG. 5. In this embodiment, the housing 501 of the FOV converter 50 is composed of a connector-side portion 520 and an inspection-side portion 530. The connector-side portion 520 is detachably coupled to the inspector-side portion 530 with a screw or a pin 537 after the rear cylindrical end 523 of the connector-side portion 520 is inserted into the front circular opening 532 of the inspector-side portion 530. In this embodiment, the front lens group 570 and the rear lens group 560 of the relay lens system 505 are both embedded or disposed in the connector-side portion 520. Namely, the relay lens system 505 is embedded in the connector-side portion 520.

For compatible connection, the structure of the front end 521 of the connector-side portion 520 of the FOV converter 50 is the same as the structure of the front portion 121 of the connector inspector 10; similarly, the structure of the rear end 531 of the inspector-side portion 530 of the FOV converter 50 is the same as the structure of the rear end 242 of the matching fitting tip 24.

Figure 7:
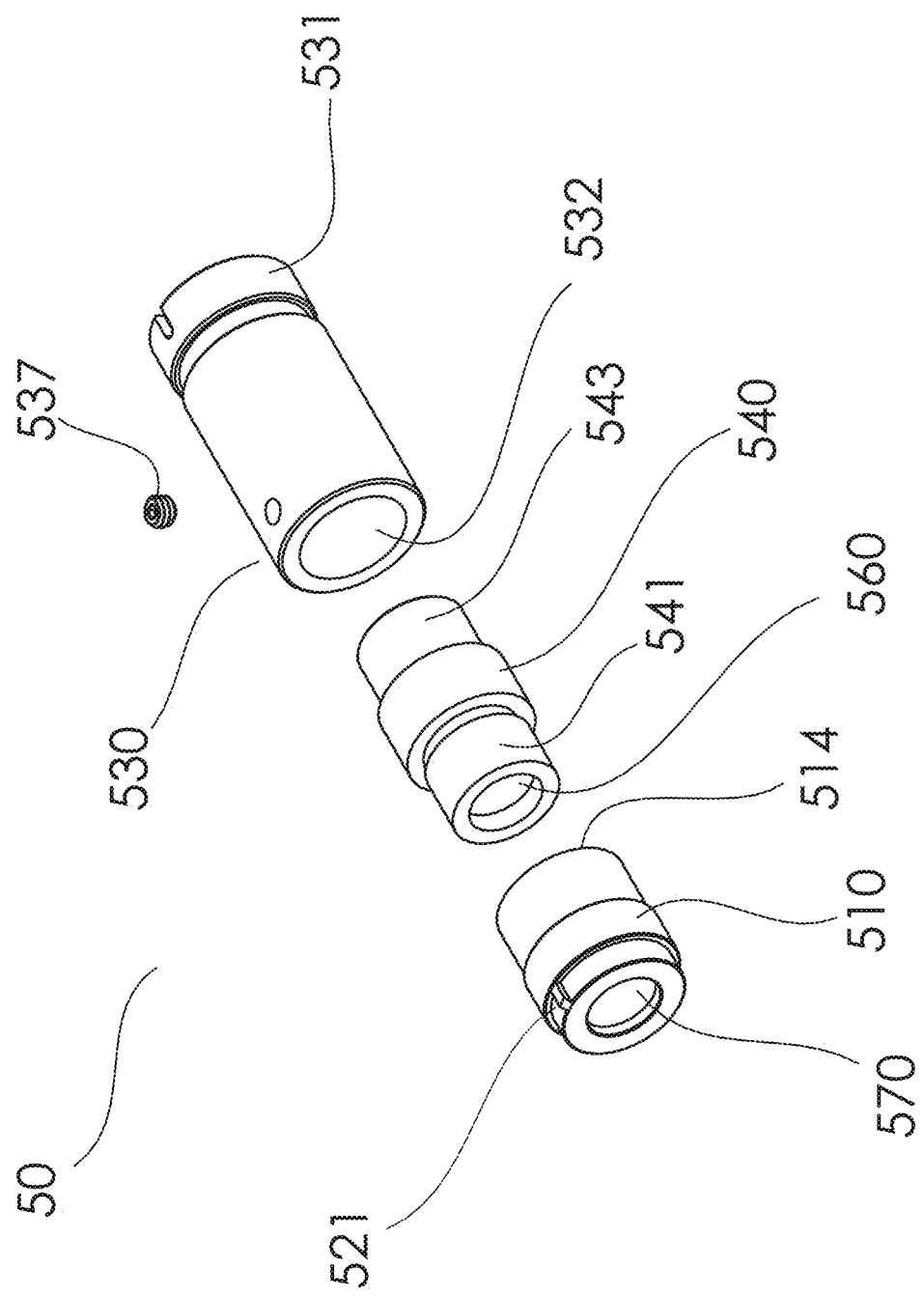
FIG. 7 shows the external structure of an FOV converter composed of three detachably coupled portions and using the relay lens system shown in FIG. 5.
Figure 8:
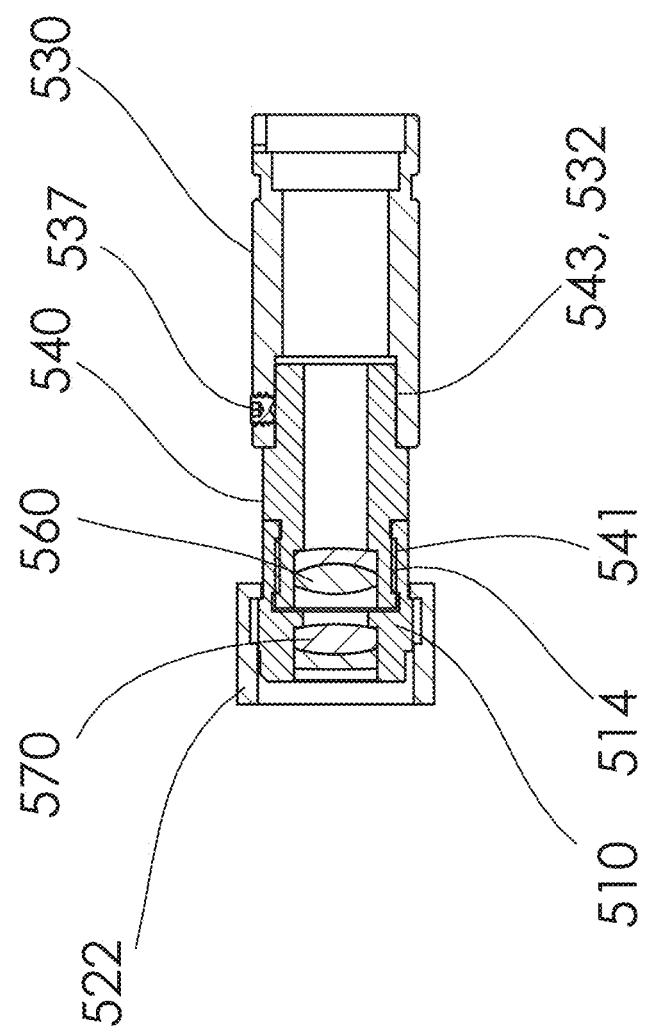
FIG. 8 shows the internal structure of the FOV converter shown in FIG. 7, with the front lens group and the rear lens group of the relay lens system respectively embedded in two of the detachably coupled portions.

FIG. 7 and FIG. 8 show yet another embodiment of the FOV converter 50 that is even more flexible in allowing the size of the converted FOV 500 (i.e. the value of M) to be varied. This embodiment of the FOV converter 50 differs from the embodiment (shown in FIG. 6) in that the connector-side portion 520 of the housing 501 is further composed of a connector-side front portion 510 and a connector-side rear portion 540 detachably coupled together with a screw or a pin 537. Moreover, the front lens group 570 is disposed or embedded in the connector-side front portion 510, whereas the rear lens group 560 is disposed or embedded in the connector-side rear portion 540. The connector-side front portion 510 is joined with the connector-side rear portion 540 by screwing the male thread at the front cylindrical end 541 of the connector-side rear portion 540 into the matching female thread at the rear circular opening 514 of the connector-side front portion 510. Similar to the embodiment in FIG. 6, the rear cylindrical end 543 of the connector-side rear portion 540 is inserted into the front circular opening 532 of the inspector-side portion 530 to couple the two components together. In other words, the FOV converter 50 of this embodiment includes three portions detachably coupled with one another: the connector-side front portion 510, the connector-side rear portion 540, and the inspector-side portion 530.

In considering the design of the FOV converter 50, the connector-side front portion 510 and the rear-side portion 530 are fixed, whereas the connector-side rear portion 540 may be replaced by another one for achieving a different M value. As described above, the value of M may be varied by varying the value of the rear focal length F6 of the rear lens group 560. As the value of the rear focal length F6 is changed, the dimension, in particular the length, of the connector-side rear portion 540 will have to be changed accordingly so that the rear focal plane 563 of the rear lens group 560 coincides with the object plane 135 of the microscope objective 130 of the connector inspector 10.

Figure 9:
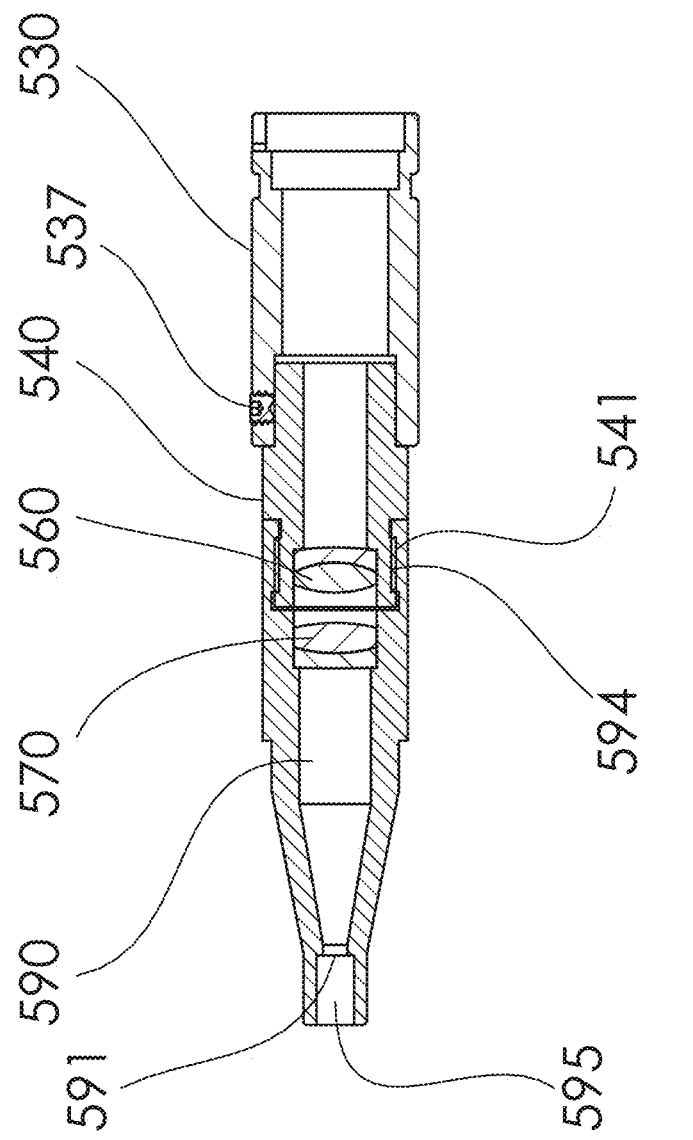
FIG. 9 shows an FOV converter according to the present application with an integrally formed matching fitting tip.

FIG. 9 illustrates yet another embodiment of the FOV converter 50 for the inspection of a PC male connector 44. This embodiment differs from the embodiment shown in FIGS. 7 and 8 in that the connector-side front portion 510 of the connector-side portion 520 and the matching fitting tip 24 (designed for interfacing with a PC male connector for the connector inspector 10) is extended to have a matching fitting tip integrally formed at its front end. The resultant "integrated fitting portion" 590 is coupled with the connector-side rear portion 540 by mating the female thread at the rear circular opening 594 thereof with the matching male thread at the front cylindrical end 541 of the connector-side rear portion 540. The front relay lens group 570 is disposed at the rear side of the integrated fitting portion 590. More specifically, the front end of the integrated fitting portion 590 has the same shape and dimension as the front end of the matching fitting tip 24 designed for the PC male connector 44. Namely, the integrated fitting portion 590 has a front inner passage 595 (similar to the front inner passage 244 of the matching fitting tip 24) for receiving the ferrule 440 of the PC male connector 44 and an annular stop surface 591 (similar to the annular stop surface 241) for stopping the endface 441 of the connector 44.

It is important to note that the FOV converter for a particular fiber-optic connector endface inspector according to the present invention can be used with all the fitting tips designed to be used with that particular connector inspector and the size of the converted field of view may be varied by varying the dimensions of the components of the FOV converter.

The invention has been described through the preferred embodiments described above and illustrated by the accompanying drawings. However, the invention is not to be limited to the exact structure and features shown in the accompanying drawings or described in the specification as various changes in the details of construction may be made without departing from the spirit of the invention.

What is claimed is:

1. A field of view (FOV) converter for a fiber-optic connector inspector, the FOV converter comprising:
    a housing with a front end designed for connecting with a fitting tip for interfacing with a fiber-optic connector to be inspected, a rear end designed for connecting to a front portion of the connector inspector, and an internal light passage extending from the front end to the rear end; and
    a relay lens system disposed inside the housing across the light passage,
    wherein the optical working distance of the relay lens system is the same as the optical working distance of the connector inspector's microscope objective, wherein the optical working distance of the relay lens system is defined as the distance between the object plane and the front optical surface of the relay lens system, and the optical working distance of the connector inspector's microscope objective is defined as the distance between the object plane and the front optical surface of the connector inspector's microscope objective; and
    the ratio of the object distance to the image distance of the relay lens system is greater than 1,
    wherein, when the front end of the housing is connected to the fitting tip interfaced with the fiber-optic connector and the rear end of the housing is connected to the connector inspector, the optical axis of the relay lens system is aligned with the optical axis of the connector inspector; the image plane of the relay lens system coincides with the object plane of the connector inspector's microscope objective; and the connector endface is placed on the object plane of the relay lens system.

2. The FOV converter as claimed in claim 1, wherein the relay lens system includes a front lens group and a rear lens group separated at a distance, and the object plane of the relay lens system is positioned on the front focal plane of the front lens group and the image plane of the relay lens system is on the rear focal plane of the rear lens group.

3. The FOV converter as claimed in claim 2, wherein the housing is composed of a connector-side portion and an inspector-side portion detachably coupled with each other, wherein the front lens group and the rear lens group of the relay lens system are both disposed inside the connector-side portion.

4. The FOV converter as claimed in claim 3, wherein a rear cylindrical end of the connector-side portion is inserted into a front circular opening of the inspector-side portion and the connector-side portion is fixed in position with a screw or a pin through a wall around the front circular opening of the inspector-side portion.

5. The FOV converter as claimed in claim 3, wherein the connector-side portion is composed of a connector-side front portion and a connector-side rear portion detachably coupled with each other, wherein the front lens group of the relay lens system is disposed inside the connector-side front portion, and the rear lens group of the relay lens system is disposed inside the connector-side rear portion.

6. The FOV converter as claimed in claim 2, wherein a spacer is disposed between the front lens group and the rear lens group.

7. The FOV converter as claimed in claim 1, wherein the front end of the housing is integrally formed with the fitting tip.

8. The FOV converter as claimed in claim 7, wherein the relay lens system includes a front lens group and a rear lens group separated at a distance, and the object plane of the relay lens system is placed on the front focal plane of the front lens group and the image plane of the relay lens system is on the rear focal plane of the rear lens group.

9. The FOV converter as claimed in claim 8, wherein the housing is composed of a connector-side portion and an inspector-side portion detachably coupled with each other, wherein the front lens group and the rear lens group of the relay lens system are both disposed inside the connector-side portion.

10. The FOV converter as claimed in claim 9, wherein the connector-side portion is composed of a connector-side front portion and a connector-side rear portion detachably coupled with each other, wherein the front lens group of the relay lens system is disposed inside the connector-side front portion, and the rear lens group of the relay lens system is disposed inside the connector-side rear portion, and the front end of the housing corresponds to the front end of the connector-side front portion.

11. The FOV converter as claimed in claim 1, wherein the ratio of the object distance to the image distance of the relay lens system is smaller than 1.

12. A fiber-optic connector inspection system, comprising:
 a fiber-optic connector inspector and a field of view (FOV) converter, the FOV converter comprising:
  a housing with a front end designed for connecting with a fitting tip for interfacing with a fiber-optic connector to be inspected, a rear end designed for connecting to a front portion of the fiber-optic connector inspector, and an internal light passage extending from the front end to the rear end; and
  a relay lens system disposed inside the housing across the light passage,
  wherein the optical working distance of the relay lens system is the same as the optical working distance of the fiber-optic connector inspector's microscope objective, wherein the optical working distance of the relay lens system is defined as the distance between the object plane and the front optical surface of the relay lens system, and the optical working distance of the fiber-optic connector inspector's microscope objective is defined as the distance between the object plane and the front optical surface of the fiber-optic connector inspector's microscope objective; and
  the ratio of the object distance to the image distance of the relay lens system is greater than 1,
  wherein, when the front end of the housing is connected to the fitting tip interfaced with the fiber-optic connector and the rear end of the housing is connected to the fiber-optic connector inspector, the optical axis of the relay lens system is aligned with the optical axis of the fiber-optic connector inspector; the image plane of the relay lens system coincides with the object plane of the fiber-optic connector inspector's microscope objective; and the connector endface is placed on the object plane of the relay lens system.

* * * * *